(12) United States Patent
Hays et al.

(10) Patent No.: US 10,318,528 B2
(45) Date of Patent: Jun. 11, 2019

(54) QUERY RESPONSE USING MAPPING TO PARAMETERIZED REPORT

(71) Applicant: Microsoft Technology Licensing, LLC, Redmond, WA (US)

(72) Inventors: Christopher A. Hays, Monroe, WA (US); Patrick J. Baumgartner, Kirkland, WA (US); Aaron Meyers, Redmond, WA (US); Jingxiao Wu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 539 days.

(21) Appl. No.: 15/054,012

(22) Filed: Feb. 25, 2016

(65) Prior Publication Data

US 2017/0249356 A1     Aug. 31, 2017

(51) Int. Cl.
*G06F 16/22*     (2019.01)
*G06F 16/242*     (2019.01)
(Continued)

(52) U.S. Cl.
CPC ........ *G06F 16/243* (2019.01); *G06F 16/2272* (2019.01); *G06F 16/248* (2019.01); *G06F 16/24522* (2019.01)

(58) Field of Classification Search
None
See application file for complete search history.

(56) References Cited

U.S. PATENT DOCUMENTS 6,081,774 A * 6/2000 de Hita ............. G06F 17/30663
704/9
7,613,719 B2    11/2009 Chang et al.
(Continued)

FOREIGN PATENT DOCUMENTS

WO    2004012066 A2    2/2004
WO    2014177301 A1    11/2014

OTHER PUBLICATIONS

"Power Bi—Demystifying Power Bi Q&A—Part 1", Published on: Feb. 27, 2014, Available at: http://blogs.msdn.com/b/powerbi/archive/2014/02/27/demystifying-power-bi-q-amp-a-part-1.aspx.
(Continued)

*Primary Examiner* — Usmann Saeed
*Assistant Examiner* — Katriel Y Chiu
(74) *Attorney, Agent, or Firm* — Workman Nydegger

(57) ABSTRACT

A mechanism for responding to a natural language query. Linguistic parsing is applied to the natural language query to generate a set of language element(s). One or more of those language elements are mapped to parameters and/or data elements of a parameterized report, which is selected for use in responding to the query based on the mapping. The selection of the parameterized report and/or mapping to the parameterized report may use the schema of the underlying dataset that the parameterized report uses in order to perform more precise mapping and selection. The selected parameterized report is then used to construct structured data that is responsive to the query. For instance, the structured data could include visualizations. In this manner, already existing parameterized reports that were previously used to generated structured data in the form of reports, may again be used in order to respond to natural language queries.

18 Claims, 6 Drawing Sheets

(51) Int. Cl.
*G06F 16/248* (2019.01)
*G06F 16/2452* (2019.01)

(56) References Cited

U.S. PATENT DOCUMENTS

| | | | |
|---|---|---|---|
| 7,873,624 B2 | 1/2011 | Agichtein et al. | |
| 8,086,593 B2 | 12/2011 | Surna et al. | |
| 8,756,245 B2 | 6/2014 | Imielinski et al. | |
| 8,812,298 B1 | 8/2014 | Wolfram et al. | |
| 8,935,277 B2 | 1/2015 | Kuchmann-Beauger et al. | |
| 8,996,555 B2 | 3/2015 | Kuchmann-Beauger et al. | |
| 9,020,824 B1 | 4/2015 | Govil | |
| 2006/0053096 A1* | 3/2006 | Subramanian | G06F 17/30398 |
| 2008/0104542 A1* | 5/2008 | Cohen | G06F 17/30864 |
| | | | 715/810 |
| 2010/0114927 A1 | 5/2010 | Becker et al. | |
| 2010/0241645 A1* | 9/2010 | Kandogan | G06F 17/271 |
| | | | 707/763 |
| 2013/0173591 A1* | 7/2013 | Cras | G06F 17/30433 |
| | | | 707/718 |
| 2015/0019216 A1 | 1/2015 | Singh et al. | |
| 2015/0100588 A1 | 4/2015 | Allen et al. | |
| 2016/0103822 A1* | 4/2016 | George | G06Q 30/0204 |
| | | | 704/9 |
| 2016/0179877 A1* | 6/2016 | Koerner | G06F 17/30401 |
| | | | 707/721 |

OTHER PUBLICATIONS

"Power Bi—Ask your data questions with Q&A", Published on: Sep. 17, 2015, Available at: http://blogs.msdn.com/b/powerbi/archive/2015/09/17/ask-your-data-questions-with-q-amp-a.aspx.
Waltinger, et al., "USI Answers: Natural Language Question Answering Over (Semi-) Structured Industry Data", In Proceedings of the Twenty-Fifth Innovative Applications of Artificial Intelligence Conference, Jul. 17, 2013, pp. 1471-1478.
International Search Report and the Written Opinion issued in PCT Patent Application No. PCT/US2017/018380—dated May 9, 2017.

* cited by examiner

QUERY RESPONSE USING MAPPING TO PARAMETERIZED REPORT

BACKGROUND

In this information age, there are massive quantities of data available. Organizing those massive quantities of data into usable information is a formidable task. Furthermore, it is extremely difficult to maximize utilization of the available data in order to respond to queries on that data. Nevertheless, as headway is made into these problems, a human being's ability to learn based on prior collective experience of mankind is accelerated. Such advances promise to not only promote, but accelerate, the progress of science and the useful arts using technology itself.

Typically, data is organized into datasets that have some structure, or schema, associated with it, and sometimes metadata that may describe the meaning of the schema. Datasets can, however, be very large. In order to distill the information into a more mentally digestible form, parameterized reports are often authored. The parameterized report defines which information is to be extracted from the dataset, how the data values are to be extracted (including parameters to control data selection), and how the resulting data is to be structured. The parameterized report produces a new structure for a portion of the data of the dataset so as to focus on a particular aspect of the information within the dataset. Such newly structured data may also include visualizations.

Often, there may be numerous parameterized reports that provide different structured data views on the underlying dataset. If a different view on the dataset is desired, then typically a new parameterized report is constructed. Often a dataset has a collection of parameterized reports that may be used to provided focused reports on particular aspects of the dataset.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a mechanism for responding to a natural language query. Linguistic parsing is applied to the natural language query to generate a set of language element(s). One or more of those language elements are mapped to parameters of a parameterized report, which is selected for use in responding to the query based on the mapping. The selection of the parameterized report and/or mapping to the parameterized report may use the schema of the underlying dataset that the parameterized report uses in order to perform more precise mapping and selection. The selected parameterized report is then used to construct structured data that is responsive to the query. For instance, the structured data could include visualizations. In this manner, already existing parameterized reports that were previously used to generate structured data in the form of reports, may again be used in order to respond to natural language queries.

This improves the accuracy of the response to a natural language query by taking advantage of the intuition of the authors of the original parameterized reports. Furthermore, such authors tend to include additional helpful information, and such helpful information may also be presented to the user to supplement the response to the query. After all, the author of the report originally applied their own intuition to decide what information would be helpful given a report having particular parameters. Accordingly, the responses to the natural language query may be enriched.

In some embodiments, the library of available parameterized reports may be greatly augmented. This may be performed by deriving a derived parameterized report based on a close-match parameterized report, and then using that derived parameterized report to respond to the query. Derived reports begin from the selected parameterized report, but then perform alterations, such as removing, replacing and/or adding parameters and/or data elements for the derived report. The derived report may also be generated by repeating all or some of the parameters over different values. If the derived report is different enough from the selected report, a different visualization type may be selected to present the derived report.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
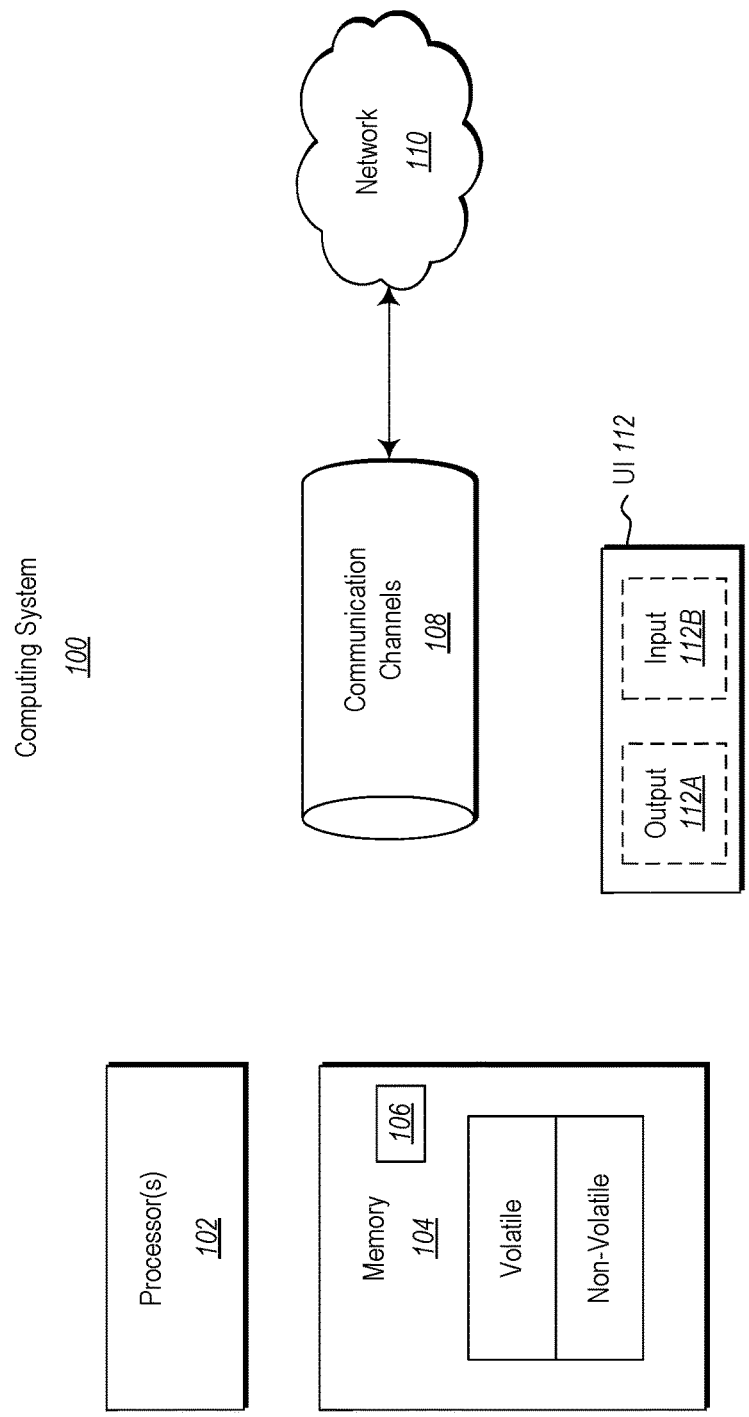
FIG. 1 illustrates an example computing system in which the principles described herein may be employed.

At least some embodiments described herein relate to a mechanism for responding to a natural language query. Linguistic parsing is applied to the natural language query to generate a set of language element(s). One or more of those language elements are mapped to parameters of a parameterized report, which is selected for use in responding to the query based on the mapping. The selection of the parameterized report and/or mapping to the parameterized report may use the schema of the underlying dataset that the parameterized report uses in order to perform more precise mapping and selection. The selected parameterized report is then used to construct structured data that is responsive to the query. For instance, the structured data could include visualizations. In this manner, already existing parameterized reports that were previously used to generate structured data in the form of reports, may again be used in order to respond to natural language queries.

This improves the accuracy of the response to a natural language query by taking advantage of the intuition of the authors of the original parameterized reports. Furthermore, such authors tend to include additional helpful information, and such helpful information may also be presented to the user to supplement the response to the query. After all, the author of the report originally applied their own intuition to decide what information would be helpful given a report having particular parameters. Accordingly, the responses to the natural language query may be enriched.

In some embodiments, the library of available parameterized reports may be greatly augmented. This may be performed by deriving a derived parameterized report based on a close-match parameterized report, and then using that derived parameterized report to respond to the query. Derived reports begin from the selected parameterized report, but then perform alterations, such as removing, replacing and/or adding parameters and/or displayed data elements for the derived report. The derived report may also be generated by repeating all or some of the parameters over different values. If the derived report is different enough from the selected report, a different visualization type may be selected to present the derived report.

Some introductory discussion of a computing system will be described with respect to FIG. 1. Then, the technology for responding to natural language queries using existing parameterized reports will be described with respect to FIGS. 2 through 4. In conclusion, variants of derived parameterized reports will then be described with respect to FIGS. 5A through 5E.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
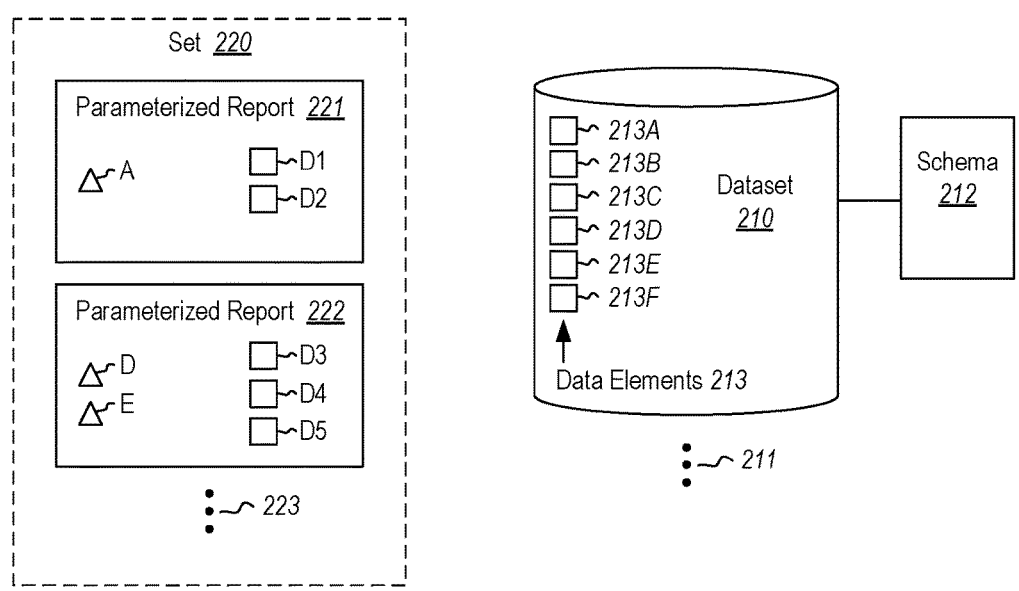
FIG. 2 illustrates a system that the principles described herein may use to respond to a natural language query, the system including a dataset and a parameterized report set.

FIG. 2 illustrates a system 200 in which the principles described herein may be employed. The system 200 may be structured as described above for the computing system 100 of FIG. 1. The system includes a dataset 210 and a parameterized report set 220. Each of the parameterized reports uses the dataset 210 in order to generate other structured data that focuses in on certain aspects of the dataset 210. One or more or all of the parameterized reports 220 may also include a visualization for presentation of some or all of their structured data via one or more output mechanisms 112A of the user interface 112 of FIG. 1. The ellipses 211 represent that any one or more of the parameterized reports may also use additional one or more datasets from which they derive their focused structured data.

The dataset 210 has an associated schema 212, and a number of data elements including data elements 213. While the dataset 210 may include any number of data elements, in the illustrated example of FIG. 2, the dataset 210 is illustrated as including data elements 213A through 213F.

The parameterized report set 220 may include any number of parameterized reports. In the illustrated example, there are two parameterized reports 221 and 222 illustrated. However, the ellipses represents that the parameterized report set may include any number of parameterized reports. In fact, in accordance with some embodiments described herein, additional parameterized reports may be added to the parameterized report set by deriving parameterized reports from the existing parameterized report set.

Each of the parameterized reports includes one or more data elements, which are derived from data elements in the data set either directly by reference or indirectly through computation. For instance, parameterized report 221 is illustrated as including data elements D1 and D2. Furthermore, each of the parameterized reports optionally includes one or more parameters. For instance, a parameterized report 221 is illustrated as including parameter A. Additionally, as an example, only, the parameterized report 222 is illustrated as including three data elements D3, D4 and D5, and parameters D and E.

Each parameterized report includes a definition for how to extract data from the dataset(s) and how to structure or re-structure the resulting data, and also potentially how to visualize the newly structured data. Parameterized reports are often authored to obtain a specific view on the dataset relevant at a particular time for a particular purpose. The parameterized report is saved within the parameterized report set 221 in case that same view is desired in the future. Any relevant changes in the dataset will also be reflected in the values presented in the focused view of the parameterized report.

Figure 3:
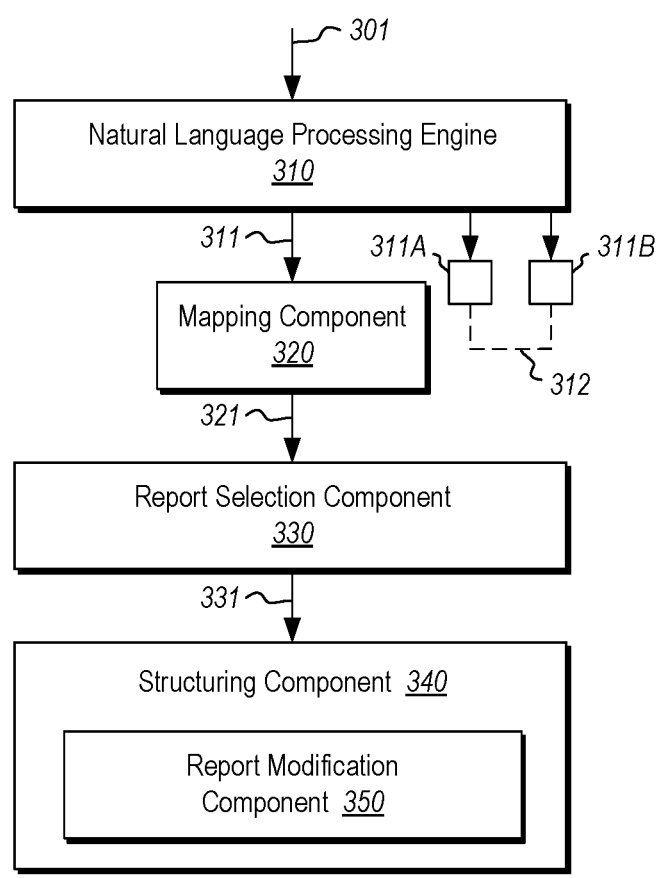
FIG. 3 illustrates an example system that operates upon the system of FIG. 2 in order to respond to natural language queries in accordance with the principles described herein.

FIG. 3 illustrates various components of a system 300 that operates upon the system 200 of FIG. 2 in order to respond to natural language queries. The system 300 may also be structured as described above for the computing system 100 of FIG. 1. The system 300 includes a natural language processing engine 310, a mapping component 320, a report selection component 330, a structuring component 340. Each of these engines and components may be structured as described above for the executable component 106 of FIG. 1. In one embodiment, the structuring component 340 also may modify a selected parameterized report to thereby generate a derived parameterized report for potential adding to the parameterized report set. Accordingly, the structuring component 340 may include or be associated with a report modification component 350, which may also be structured as described above for the executable component 106.

Figure 4:
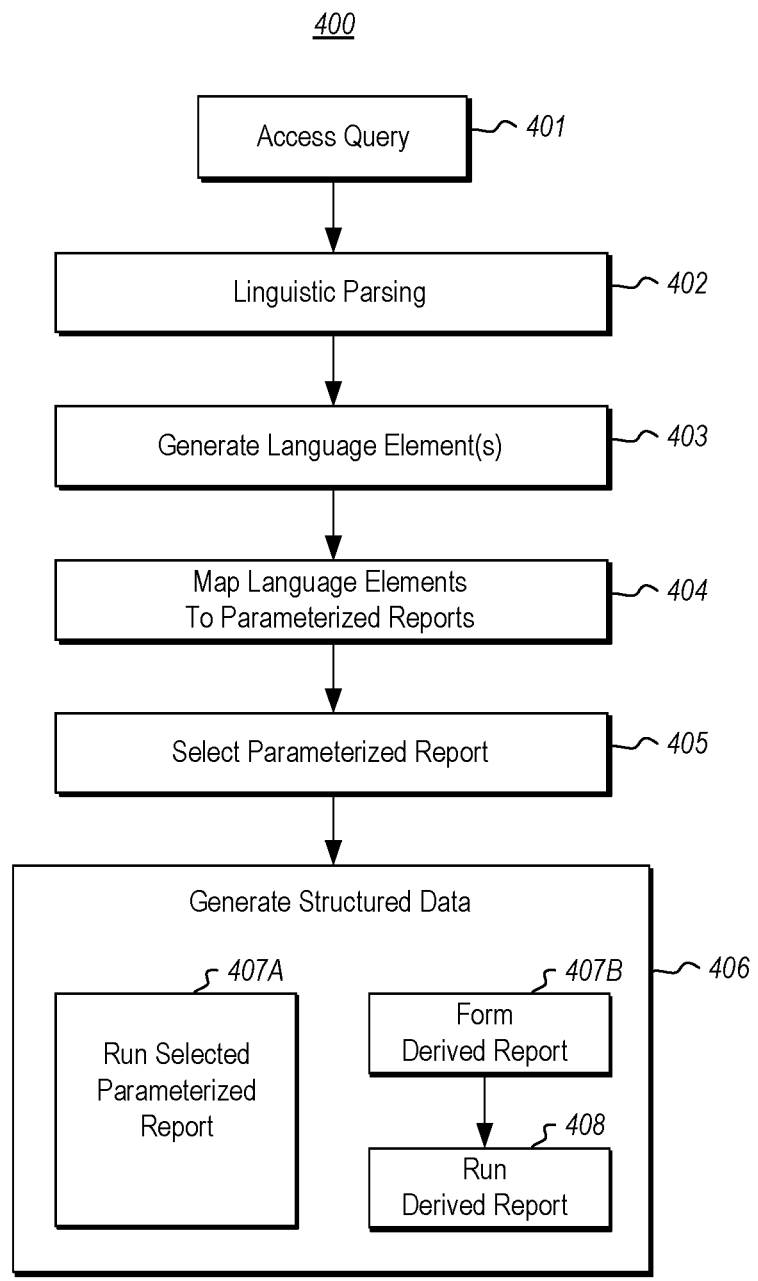
FIG. 4 illustrates a flowchart of a method for responding to a natural language query using at least one parameterized report in accordance with the principles described herein.

FIG. 4 illustrates a flowchart of a method 400 for responding to a natural language query using at least one parameterized report. As the system 300 of FIG. 3 may perform the method 400 in the context of the system 200 of FIG. 2, FIG. 4 and the remaining structure of FIG. 3 will now be described with frequent reference to FIGS. 2 through 4.

The method 400 is initiated upon accessing a natural language query (act 401). For instance, the system 300 accesses natural language query 301 into the natural language processing engine 310. The natural language query 301 may have been generated by, for instance, a human user interfacing with the input mechanisms 112B of the user interface 112 of the computing system 100 that is or communicates with the system 300 of FIG. 3.

The method 400 then includes applying computerized linguistic parsing to the natural language query (402) to thereby generate a set of one or more language elements (act 403). For instance, the natural language processing engine 310 applies linguistic parsing to natural language queries such as the natural language query 301 to generate corresponding sets of language elements 311. As an example, in response to the natural language query 301, the natural language processing engine 310 generates language elements 311A and 311B having a relationship 312. As a very specific example, the natural language query might be "Show me sales for the Eastern seaboard region". The natural language processing engine 310 may thereby generate natural language element "revenue" and "East U.S.A." with the first natural language element being a "generated within" relationship to the second natural language element.

The method 400 then includes mapping one or more language elements to at least one of a plurality of parameters and/or data elements of a parameterized report (act 404). Referencing FIG. 3, the mapping component 320 maps at least some of the natural language element(s) 311 generated by the natural language processing engine 310 to one or more parameters and/or data elements of a parameterized report. This mapping result is represented by arrow 321. For instance, suppose in FIG. 2, that the parameterized report 221 happens to have a "gross revenue" data element (e.g., data element D1), and a "region" parameter of value "domestic-east" (e.g., parameter A). With the schema of these parameters, the mapping component 320 might map the language element "revenue" to the "gross revenue" data element of the parameterized report 221, and map the language element "Eastern U.S.A." to the "region" parameter of "domestic-east" of the parametrized report 221.

The mapping component 320 may perform this mapping using also the dataset schema 321 to determine if mapping between particular language elements and report parameters and/or data elements should occur, or to determine if the parameter definitions are close enough to merit a match. For instance, the mapping component 320 may be aware of a region and state data element within the schema of the dataset 210, and may know that those entries with the region of "domestic-east" correspond to the states of Maine, Vermont, New Hampshire, New York, Rhode Island, Connecticut, Pennsylvania, New Jersey, Maryland, and Virginia. While this might not necessarily comport with everyone's definition of "Eastern seaboard" (some might also include the Carolinas, Georgia, and even Florida), the mapping component 320 may determine, based on this knowledge of the underlining dataset schema, that the mapping should be made as a reasonably good approximation.

The mapping component 320 may also take into consideration the relationship 312. For instance, the relationship 312 is in the example natural language query "generated within". The schema 212 of the dataset 210 may have a relationship between the "gross revenue" field and the "region field" of a more general "associated with" relationship. Nevertheless, the mapping component 320 may determine that this relationship is a good approximation of the original relationship of the language elements. The mapping may also be performed based on metadata about the parameters. For instance, a dataset (such as dataset 210) and/or a parameterized report (such as parameterized report 221) may include some computer-interpretable data that describes some or all of their parameters and/or relationships therebetween.

Returning to the method 400 of FIG. 4, based on the mapping (act 404), a parameterized report is selected for use in responding to the natural language query. For instance, in FIG. 3, the report selection component 330 may select to use the parameterized report 221 in responding to the natural language query based on the positive mapping results that the mapping component 320 made to that parameterized report 221. Note that the mapping component 320 may also have mapped one or more of the language elements to the second parameterized report 222. However, that second mapping may not have scored as close of a match as the mapping to the first parameterized report 221. Accordingly, the report selection component 330 selects the first parametrized report 221 to use to respond to the natural language query. This selection is represented by arrow 331 in FIG. 3. The report selection component 330 may also use the dataset schema 212 and or knowledge of the relationship 312 between the language elements in order to score the propriety of the mapping to each of the parameterized reports.

Returning to FIG. 4, the method 400 then uses the selected report to generate structured data that responds to the natural language query (act 406). This improves the accuracy of the response to a natural language query by taking advantage of the intuition of the authors of the original parameterized reports. Furthermore, such authors tend to include additional helpful information, and such helpful information may also be presented to the user to supplement the response to the query. After all, the author of the report originally applied their own intuition to decide what information would be helpful given a report having particular parameters.

This use of the selected report (act 406) may be performed by the structuring component 340. This using of the selected report may include simply letting the selected parameterized report run (act 407A) to operate as it normally would. For instance, the mapping may have been good enough that simply running the selected parameterized report with the parameter values derived by the mapping component will give the user a suitable response to the natural language query.

In cases of less precise mapping, the structuring component 340 may actually first create a derived parameterized report (act 407B) based on the selected parameterized report. For instance, in FIG. 3, a report modification component 350 may generate the derived parameterized report. Optionally this derived parameterized report may be added to the available parameterized report set. The structuring component 340 uses the derived parameterized report in order to generate the structured data that responds to the request (act 408). A derived parameterized report may be created by the report modification component 350 making a copy of the selected parameterized report, and then editing the definition to remove, modify, add, and/or repeat sets of one or more parameters and/or data elements.

In the case of formulation of derived parameterized reports, the library of available parameterized reports may be greatly augmented as time passes and different natural language queries received and processed. If the derived report is different enough from the selected report, a different visualization type may be selected to present the derived report. The structuring component may know which visualization types tend to be more suitable for different parameters and data elements. The difference in parameters and/or data elements of the derived parameterized report as compared to the selected parameterized report may be sufficient that the use of a different visualization is warranted.

Example modifications will now be described with actual example natural language queries, and with illustrations of the various modifications with respect to FIGS. 5A through 5E. This example extends from the prior example in which the natural language query was "Show me sales for the Eastern seaboard region" and the corresponding parsed language element were "revenue" and "East U.S.A." with the "generated within" relationship.

Figure 5A:
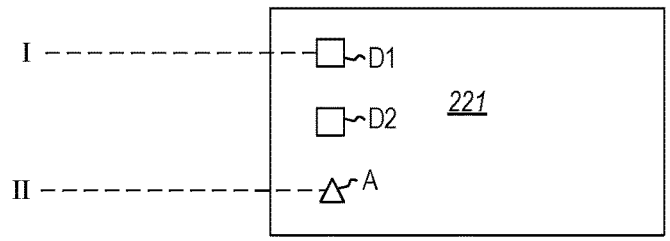
FIG. 5A illustrate natural language query language elements as mapped to a selected parameterized report.

FIG. 5A illustrates a mapping of the language element "revenue" (language element I) to the data element D1 of the parameterized report 221; and the mapping of the language element "East U.S.A" (language element II) to the parameter A of the parameterized report 221. In this case, the parameterized report 221 is directly used to generate structured data that responds to the query.

Figure 5B:
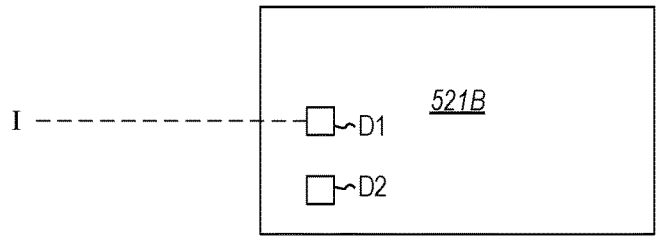
FIG. 5B illustrates a natural language query language element as mapped to a parameterized report that is derived from the selected parameterized report in a manner that a parameter is removed.
Figure 5C:
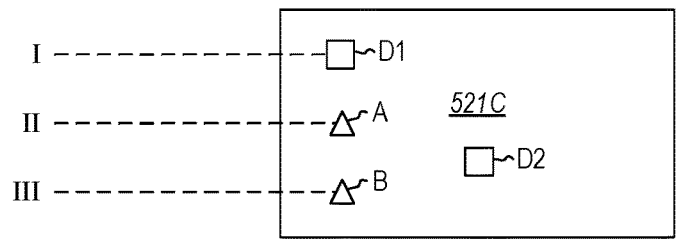
FIG. 5C illustrate natural language query language elements as mapped to a parameterized report that is derived from the selected parameterized report in a manner that a parameter is added.
Figure 5D:
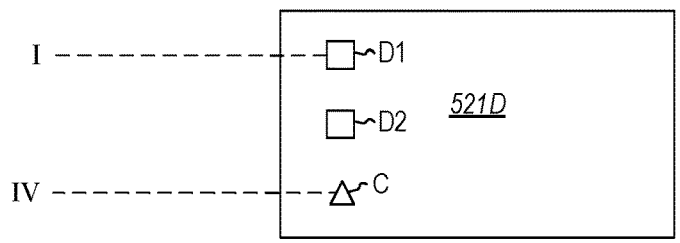
FIG. 5D illustrate natural language query language elements as mapped to a parameterized report that is derived from the selected parameterized report in a manner that a parameter is replaced.
Figure 5E:
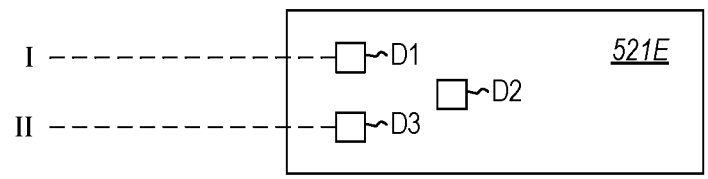
FIG. 5E illustrate natural language query language elements as mapped to a parameterized report that is derived from the selected parameterized report in a manner that a parameter value is repeated.

However, suppose instead that the natural language query was "Show sales". Now, the language element "revenue" (language element I) is mapped to data element D1 of the parameterized report 221. However, there is no natural language element to map to the parameter A of the parameterized report 221. Accordingly, simply running the parameterized report 221 would not give an appropriate response to the natural language query. Accordingly, the report modification component generates a derived parameterized report 521B that removes the parameter A in deriving a parameterized report 521B as illustrated in FIG. 5B. The derived parameterized report 521B may then be run to generate the structure data that is responsive to the natural language query.

Now, suppose instead that the natural language query was "Show sales for the Eastern seaboard region in 2015". Now there is an additional language element III of "2015". Now, the language element "revenue" (language element I) is mapped to data element D1 of the parameterized report 221. Furthermore, the language element "East U.S.A." (language element II) maps to parameter A of the parameterized report 221. However, there are no parameters of the parameterized report to map the language element "year" with value "2015" (language element III) to (i.e., parameter B). Accordingly, the report modification component generates a derived parameterized report that adds a parameter B in deriving a parameterized report 521C of FIG. 5C. Now, all of the three natural language elements I, II and III are mapped to an appropriate parameter or data element of the derived parameterized report 521C. The derived parameterized report 521C may then be run to generate the structure data that is responsive to the natural language query.

Now, suppose instead that the natural language query was "Show retail sales". Now, instead of the language element "East U.S.A.", there is a language element IV of "retail". Now, the language element "revenue" (language element I) is mapped to data element D1 of the parameterized report 221. However, the language element IV "retail" does not map to parameter A of the parameterized report 221. Accordingly, the report modification component generates a derived parameterized report that replaces parameter A with parameter C in deriving a parameterized report 521D of FIG. 5D. Now, the two natural language elements I and IV are mapped to an appropriate parameter or data element of the derived parameterized report 521D. The derived parameterized report 521D may then be run to generate the structure data that is responsive to the natural language query.

Now, suppose instead that the natural language query was "Show me sales for each region". Now, instead of the language element "East U.S.A.", there is a repeated array of region elements having different values (such as "East U.S.A., Mountain region, Southwest, Northwest, Europe, East Asia, Middle East, Easter Europe, Western Europe, North Africa, West Africa, South Africa, Australia, South Brazil, South America—Other" and so forth). Now, the language element "revenue" (language element I) is mapped to data element D1 of the parameterized report 221. The language element II of "each region" would map to parameter A of the parameterized report 221, however, it cannot because it contains a collection of multiple values. Accordingly, the report modification component generates a derived parameterized report that removes parameter A and replaces it with data element D3 which corresponds to the region, to thereby create derived parameterized report 521E. The derived parameterized report 521E may then be run to generate the structure data that is responsive to the natural language query.

Figure 5F:
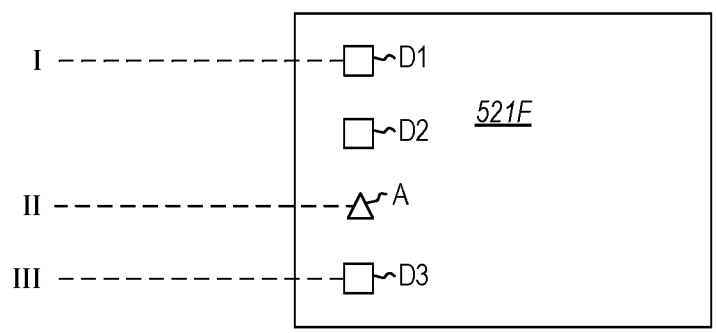
FIG. 5F illustrates natural language query language elements as mapped to a parameterized report that is derived from the selected parameterized report in which a data element is added.

Now, suppose instead that the natural language query was "Show me sales and budget for the Eastern seaboard region". Now, the language element "revenue" (language element I) is mapped to data element D1 of the parameterized report 221. Furthermore, the language element "East U.S.A." (language element II) maps to parameter A of the parameterized report 221. However, there are no parameters or data elements of the parameterized report to map the language element "budget" (language element III) to. Accordingly, the report modification component generates a derived parameterized report that adds a data element D3, which corresponds to the budget data element from the data set 210, in deriving a parameterized report 521F of FIG. 5F. Now, three of the natural language elements I, II and III are mapped to an appropriate parameter or data element of the derived parameterized report 521F. The derived parameterized report 521F may then be run to generate the structure data that is responsive to the natural language query.

Accordingly, the principles described herein provide a technical mechanism to reuse parameterized reports and/or derive parameterized reports from existing parameterized reports, in order to respond to natural language queries. Such takes advantage of the intuition and efforts of the original author of the parameterized report in presenting the appropriate information from the dataset. Furthermore, the response may be adorned with additional information that the original author of the parameterized report thought might be helpful. Furthermore, through using derived parameterized reports, parameterized reports are not drafted from scratch, but are derived based on existing parameterized reports. Such allows for more appropriate responses to a greater variety of natural language queries, and also allows for natural building of a parameterized report library.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
  a dataset having a plurality of data elements;
  a plurality of parameterized reports that are constructed from structured data based on at least the dataset, the structured data for each of the plurality of parameterized reports having a corresponding set of data elements;
  a natural language processing engine configured to apply a linguistic parsing to natural language queries to generate corresponding language elements;
  a mapping component that, for each respective report of at least some of the plurality of parameterized reports:
    maps some of the language elements to at least some of the data elements of the respective parameterized report; and
    assigns a mapping score to the respective parameterized report;
  a report selection component that, for each of at least some natural language queries and based on the mapping scores of the mapping component, selects one or more of the plurality of parameterized reports to respond to the natural language query;
  a report modification component that, when it is determined the selected one or more of the plurality of parameterized reports is insufficient to fully respond to the natural language query, generates a derived report based on at least one of the selected parameterized reports; and
  a structuring component that uses at least the selected one or more of the plurality of parameterized reports, and any derived reports necessary to respond to the natural language query, to generate structured data to respond to the natural language query.

2. The system in accordance with claim 1, the report selection component also using a schema of the particular dataset to select the one or more parameterized reports to use to respond to the natural language query for at least some of the natural language queries.

3. The system in accordance with claim 1, the mapping component also using a schema of the particular data set to perform the mapping for at least some of the natural language queries.

4. The system in accordance with claim 1, the mapping component also using one or more relationships between language elements to perform the mapping for at least some of the natural language queries.

5. The system in accordance with claim 1, the derived report having one or more parameters and/or data elements removed from the corresponding selected parameterized report.

6. The system in accordance with claim 5, the one or more parameters and/or data elements being removed including one or more particular parameters being removed, the derived report having one or more data elements added to the corresponding selected parameterized report to replace the one or more particular parameters that had been removed from the corresponding selected parameterized report.

7. The system in accordance with claim 1, the derived report having one or more parameters and/or data elements added to the corresponding selected parameterized report.

8. The system in accordance with claim 1, the derived report replacing one or more parameters and/or data elements of the corresponding selected parameterized report.

9. The system in accordance with claim 1, the corresponding selected parameterized report being a visualized report, the derived report also being a visualized report that has a different visualization than the corresponding selected parameterized report.

10. The system in accordance with claim 1, at least some of the plurality of parameterized reports being visualizations.

11. The system in accordance with claim 1, the mapping performed by the mapping component including mapping to parameters based on described parameters of at least some of the plurality of parameterized reports.

12. A method for responding to a natural language query, the method comprising:
  obtaining a dataset having a plurality of data elements;

obtaining a plurality of parameterized reports that are constructed from structured data based on at least the dataset, the structured data for each of the plurality of parameterized reports having a corresponding set of data elements;

accessing a natural language query;

apply computerized linguistic parsing to the natural language query to generate a set of natural language elements;

for each of at least some of the plurality of parameterized reports:

mapping some of the natural language elements to at least some of the data elements of the parameterized report; and assigning a mapping score to the parameterized report;

based on the assigned mapping scores, selecting one of the plurality of parameterized reports for use in responding to the natural language query;

determining that the selected one of the plurality of parameterized reports is insufficient to fully respond to the natural language query;

generating a derived report based on at least the selected one of the plurality of parameterized reports; and using the selected one of the plurality of parameterized reports, and any derived reports necessary to respond to the natural language query, to generated structured data that responds to the natural language query.

13. The method in accordance with claim 12, further comprising using a schema of the dataset, in addition to the assigned mapping score, to select the parameterized report to use to respond to the natural language query.

14. The method in accordance with claim 12, the mapping further including using a schema of the particular dataset to perform the mapping.

15. The method in accordance with claim 12, the mapping further including using one or more relationships between language elements to perform the mapping.

16. The method in accordance with claim 1, the selected parameterized report being a visualization, the derived parameterized reporting being a different visualization.

17. The method in accordance with claim 12, the selected parameterized report being a visualization.

18. A computer program product comprising one or more computer-readable storage media having thereon computer-executable instructions that are structured such that, when executed by one or more processors of a computing system, the computing system is configured to instantiate and/or operate the following:

a natural language processing engine configured to apply a linguistic parsing to natural language queries to generate corresponding sets of language elements;

a mapping component that performs the following for each respective report of a plurality of parameterized reports, wherein each parameterized report includes a set of data elements corresponding to a set of data elements of a dataset:

maps some of the generated language elements to at least some of the data elements of the respective parameterized report; and assigns a mapping score to the respective parameterized report;

a report selection component that, based on the assigned mapping scores, selects a parameterized report to use to respond to the natural language query;

a report modification component that, when it is determined the selected parameterized report is insufficient to fully respond to the natural language query, generates a derived report based at least on the selected parameterized report; and a structuring component that uses at least the selected parameterized report, and the derived report, to generate structured data to respond to the natural language query.

\* \* \* \* \*